United States Patent
Yoshida et al.

(10) Patent No.: US 8,815,423 B2
(45) Date of Patent: Aug. 26, 2014

(54) FUEL CELL SYSTEM COMPRISING VOLTAGE ADJUSTMENT PORTION, CONTROL METHOD FOR THE FUEL CELL SYSTEM, AND VEHICLE EQUIPPED WITH THE FUEL CELL SYSTEM

(75) Inventors: Michio Yoshida, Miyoshi (JP); Atsushi Imai, Gamagori (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 325 days.

(21) Appl. No.: 13/258,129

(22) PCT Filed: Mar. 18, 2010

(86) PCT No.: PCT/IB2010/000562
§ 371 (c)(1),
(2), (4) Date: Sep. 21, 2011

(87) PCT Pub. No.: WO2010/112998
PCT Pub. Date: Oct. 7, 2010

(65) Prior Publication Data
US 2012/0021257 A1 Jan. 26, 2012

(30) Foreign Application Priority Data
Mar. 31, 2009 (JP) ................. 2009-085110

(51) Int. Cl.
| | |
|---|---|
| H01M 8/04 | (2006.01) |
| H01M 16/00 | (2006.01) |
| B60K 1/00 | (2006.01) |
| H02J 7/00 | (2006.01) |

(52) U.S. Cl.
CPC ...... *H01M 8/04559* (2013.01); *H01M 8/04626* (2013.01); *H01M 8/0488* (2013.01); *H01M 16/003* (2013.01); *Y02E 60/50* (2013.01); *H01M 8/04567* (2013.01); *H01M 8/04955* (2013.01)
USPC .............. 429/9; 429/429; 429/430; 180/65.1; 320/103

(58) Field of Classification Search
USPC ........ 429/9, 429, 430, 431, 428, 442; 307/87, 307/46; 180/60, 65.31, 65.1; 320/103
See application file for complete search history.

(56) References Cited

U.S. PATENT DOCUMENTS 4,775,800 A * 10/1988 Wood .............................. 307/46
4,962,462 A   10/1990 Fekete
(Continued)

FOREIGN PATENT DOCUMENTS

JP    2007-026891 A    2/2007
WO   WO-2008099743 A1 * 8/2008

OTHER PUBLICATIONS

International Search Report issued Jul. 7, 2010 in PCT/IB2010/000562 & Written Opinion.

*Primary Examiner* — Kenneth Douyette
(74) *Attorney, Agent, or Firm* — Kenyon & Kenyon LLP (57) ABSTRACT

A fuel cell system includes a fuel cell, a secondary cell, a voltage transformer, and a control portion. The control portion charges the secondary cell with surplus electric power at the time of starting the fuel cell, and adjusts voltage of the fuel cell between an open-circuit voltage and a high-potential-avoiding voltage in the case where the secondary cell is expected to become overcharged while the output voltage of the fuel cell is decreased from the open-circuit voltage to the high-potential-avoiding voltage. The foregoing case is at least one of the case where a passage electric power that passes through the voltage transformer exceeds a secondary cell-charging-purpose permitted-to-pass electric power, the case where the input electric power restriction value for the secondary cell is exceeded, and the case where amount of regeneration by the mover that is charged is not restricted.

5 Claims, 4 Drawing Sheets

(56) References Cited

U.S. PATENT DOCUMENTS

| | | | |
|---|---|---|---|
| 6,593,671 B1* | 7/2003 | Schell | 307/87 |
| 2001/0018138 A1* | 8/2001 | Iwase | 429/13 |
| 2005/0014043 A1* | 1/2005 | Kozu et al. | 429/22 |
| 2005/0064264 A1* | 3/2005 | Ito et al. | 429/34 |
| 2005/0249985 A1* | 11/2005 | Muller et al. | 429/9 |
| 2006/0029846 A1 | 2/2006 | Konoto et al. | |
| 2006/0159966 A1* | 7/2006 | Wake et al. | 429/13 |
| 2006/0238033 A1 | 10/2006 | Raiser et al. | |
| 2007/0111057 A1* | 5/2007 | Kajiwara | 429/22 |
| 2010/0055521 A1* | 3/2010 | Umayahara et al. | 429/23 |

* cited by examiner

FUEL CELL SYSTEM COMPRISING VOLTAGE ADJUSTMENT PORTION, CONTROL METHOD FOR THE FUEL CELL SYSTEM, AND VEHICLE EQUIPPED WITH THE FUEL CELL SYSTEM

This is a 371 national phase application of PCT/IB2010/000562 filed 18 Mar. 2010, which claims priority to Japanese Patent Application No. 2009-085110 filed 31 Mar. 2009, the contents of which are incorporated herein by reference.

FIELD OF THE INVENTION

The invention relates to a fuel cell system, a control method for the fuel cell system, and a vehicle equipped with the fuel cell system.

BACKGROUND OF THE INVENTION

Practical application of a fuel cell that supplies hydrogen as a fuel gas to a fuel electrode, and that supplies air as an oxidant gas to an oxidant electrode, and that generates electricity through an electrochemical reaction between hydrogen and oxygen in the air while producing water on an oxidant electrode is now being considered.

In such a fuel cell, if at the time of start of operation, the pressure of hydrogen supplied to the fuel electrode and the pressure of air supplied to the oxidant electrode are about equal to the respective pressures occurring during ordinary operation, it sometimes happens that hydrogen gas and air are unevenly distributed in the fuel electrode and the oxidant electrode, respectively, and the electrodes are degraded by electrochemical reaction caused by the uneven distribution of these gases. Japanese Patent Application Publication No. 2007-26891 (JP-A-2007-26891) discloses a method of preventing the degradation of the electrodes of a fuel cell by causing the pressures of hydrogen and air supplied to the fuel electrode and the oxidant electrode, respectively, at the time of start of operation of the fuel cell to be higher than the ordinary supplied pressures of these gases.

However, if hydrogen gas and air are supplied at high pressure to a fuel cell when the fuel cell starts operation, it sometimes happen that the rate of rise of the voltage of the fuel cell becomes large so that the voltage of the fuel cell overshoots its upper-limit voltage. In conjunction with this problem, Japanese Patent Application Publication No. 2007-26891 (JP-A-2007-26891) discloses a method in which when hydrogen gas and air are supplied, at the time of starting a fuel cell, at pressures that are higher than their pressures given during ordinary power generation, output electric power is extracted from the fuel cell, and is put out to a vehicle driving motor, resistors, etc., provided that the voltage of the fuel cell reaches a predetermined voltage that is lower than the upper-limit voltage.

In an electric vehicle equipped with a fuel cell, an output electric power command value for the fuel cell is calculated on the basis of a requested electric power from a load, and the output current-voltage characteristic of the fuel cell. However, at the time of starting the fuel cell, while the voltage of the fuel cell is rising from a starting voltage, electric current does not flow from the fuel cell due to the blocking by a blocking diode. On another hand, for example, in a method in which after the voltage of the fuel cell, at the time of starting the fuel cell, is temporarily raised to an open-circuit voltage (hereinafter, referred to as "OCV"), a control voltage of the fuel cell is lowered and electric power is extracted from the fuel cell, a control in which the voltage of the fuel cell is set at the OCV so that current does not flow out from the fuel cell is performed until the electricity generation of the fuel cell is permitted. In this case, however, there is possibility that durability of the fuel cell may be affected.

Therefore, it is desirable that even before electricity generation of the fuel cell is permitted, the output voltage of the fuel cell be lowered below the OCV. However, since the state of catalysts of the fuel cell immediately following the start thereof varies, the amount of electricity generated by the fuel cell immediately after the starting of thereof remarkably fluctuates. Then, if the fuel cell, at the time of start thereof, generates more electric power than required by the load, the surplus electric power is charged into a secondary cell that is provided in the electric vehicle.

However, if the secondary cell is charged in a manner of, for example, high-rate charging, charging from a high SOC (state of charge), charging at low temperature (e.g., 0° C.) (charging in a high resistance state), etc., there is possibility that the secondary cell may become overcharged, and that durability of the secondary cell may be adversely affected.

SUMMARY OF THE INVENTION

The invention provides a fuel cell system that performs the power management of a fuel cell at the time of starting the fuel cell, in order to restrain overcharge of the secondary cell, and also provides a control method for the fuel cell system, and a vehicle equipped with the fuel cell system.

A first aspect of the invention relates to a fuel cell system. This fuel cell system includes: a fuel cell that generates electricity through an electrochemical reaction between a fuel gas and an oxidant gas; a secondary cell that is chargeable and dischargeable and that is charged with electric power that is output from the fuel cell; and a control portion that controls amount of electricity generated by the fuel cell at a time of starting the fuel cell. The control portion has a voltage adjustment portion that charges the secondary cell with surplus electric power at the time of starting the fuel cell, and that adjusts voltage of the fuel cell between an open-circuit voltage and a high-potential-avoiding voltage in a case where the secondary cell is expected to become overcharged while the output voltage of the fuel cell is decreased from the open-circuit voltage to the high-potential-avoiding voltage.

At the time of starting the fuel cell, the amount of electricity from the fuel cell is managed by adjusting the output voltage of the fuel cell at the time of the starting while taking into account the amount of electricity that can be charged into the secondary cell. Therefore, the overcharged state of the secondary cell is avoided, so that durability of the secondary cell will be secured.

The foregoing fuel cell system may further include: a voltage transformer provided between the secondary cell and a load; and a mover, and the case where the secondary cell is expected to become overcharged, which is mentioned above in conjunction with the voltage adjustment portion, may be at least one of a case where a passage electric power that passes through the voltage transformer exceeds a secondary cell-charging-purpose permitted-to-pass electric power that is found based at least on efficiency of the voltage transformer, and on an input electric power restriction value for the secondary cell, a case where the input electric power restriction value for the secondary cell is exceeded, and a case where amount of regeneration by the mover is not restricted.

The regenerated energy from the mover is also charged into the secondary cell. Therefore, at the time of starting the fuel cell, if the passage electric power that passes through the voltage transformer exceeds the secondary cell-charging-purpose permitted-to-pass electric power that is found on the basis of at least the efficiency of the voltage transformer, and the input electric power restriction value, or if the input electric power restriction value for the secondary cell is exceeded, or if the amount of electricity regenerated by the mover which is charged is not restricted, the amount of electricity from the fuel cell is managed by adjusting the output voltage of the fuel cell at the time of the starting, so that the regenerated energy is stored into the secondary cell, and the overcharged state of the secondary cell is avoided. As a result, fuel economy improves, and durability of the secondary cell is also secured.

The control portion may further include: an electricity generation amount calculation portion that calculates amount of electricity generated by the fuel cell by measuring voltage of the fuel cell; an SOC estimation portion that estimates state of charge of the secondary cell; a regeneration amount calculation portion that calculates amount of regeneration provided by the mover; an input electric power restriction value calculation portion that calculates an input electric power restriction value for the secondary cell based on the state of charge of the secondary cell estimated, and on the amount of regeneration by the mover; a permitted-for-charging electric power calculation portion that finds a secondary cell-charging-purpose permitted-to-pass electric power based at least on efficiency of a voltage transformer, and on the input electric power restriction value; and an inputable electric power amount calculation portion that finds a first difference between the calculated secondary cell-side permitted-for-charging electric power and the calculated amount of electricity generated by the fuel cell, and that finds a second difference between the estimated state of charge of the secondary cell and the calculated input electric power restriction value, and that calculates an amount of electric power that is inputable to the secondary cell based on a smaller difference of the first difference and the second difference, and the voltage adjustment portion may calculate amount of electricity that the fuel cell is able to generate based on an inputable amount of electric power, and may adjust the output voltage of the fuel cell between the open-circuit voltage and a target voltage.

The control portion finds the first difference between the secondary cell-side permitted-for-charging electric power and the amount of electricity generated by the fuel cell (i.e., the amount of electric power input into the secondary cell from the fuel cell), and the second difference between the estimated state of charge (SOC amount) of the secondary cell and the calculated input electric power restriction value $W_{in}$ (i.e., the amount of electricity that can be charged into the secondary cell), and calculates the amount of electric power that can be input to the secondary cell, on the basis of the smaller one of the first differences and the second difference. Thus, the control portion manages the amount of electricity from the fuel cell by adjusting the output voltage of the fuel cell, so as to avoid the overcharged state of the secondary cell. As a result, it is ensured that durability of the secondary cell is maintained.

A second aspect of the invention relates to a vehicle. This vehicle has the foregoing fuel cell system.

In the electric vehicle, the invention relating to the fuel cell at the time of the starting thereof restrains the secondary cell from becoming overcharged, and prevents performance decline of the secondary cell.

A third aspect of the invention relates to a control method for a fuel cell system. The fuel cell system includes: a fuel cell that generates electricity through an electrochemical reaction between a fuel gas and an oxidant gas; a secondary cell that is chargeable and dischargeable and that is charged with electric power that is output from the fuel cell; and a control portion that controls amount of electricity generated by the fuel cell at a time of starting the fuel cell. The control method of this fuel cell system includes: charging the secondary cell with surplus electric power at the time of starting the fuel cell; determining whether or not the secondary cell is to become overcharged when output voltage of the fuel cell is decreased from an open-circuit voltage to a high-potential-avoiding voltage; and adjusting voltage of the fuel cell between the open-circuit voltage and the high-potential-avoiding voltage if it is determined that the secondary cell is to become overcharged.

According to the fuel cell system, the control method for the fuel cell system, and the vehicle equipped with the fuel cell system in accordance with the foregoing aspects of the invention, the amount of electricity from the fuel cell is managed by adjusting the output voltage of the fuel cell at the time of starting the fuel cell while taking into account the amount of electricity that can be charged into the secondary cell. Therefore, the overcharged state of the secondary cell is avoided.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
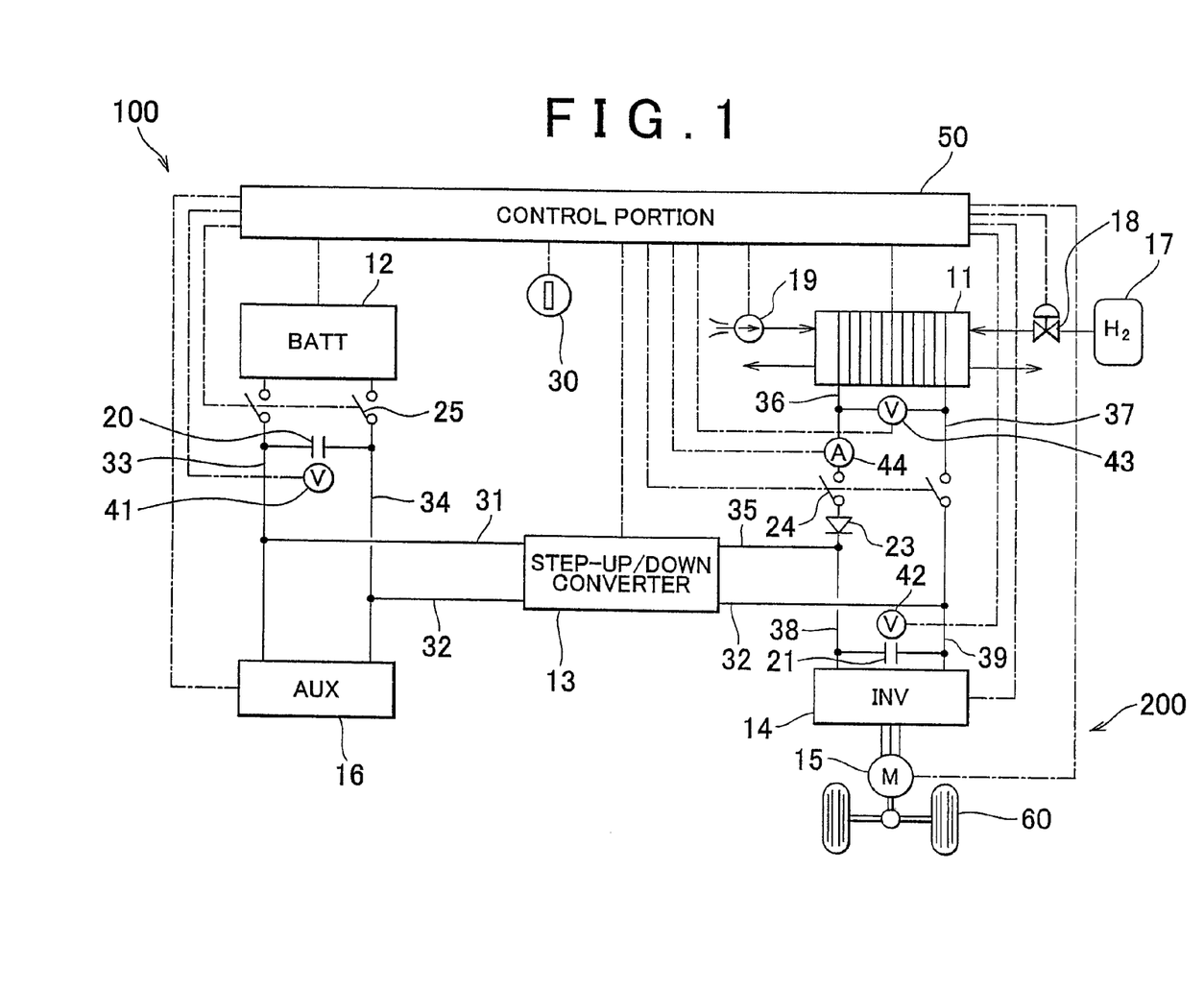
FIG. 1 is a system diagram of a fuel cell system in an embodiment of the invention.

As shown in FIG. 1, a fuel cell system 100 mounted in an electric vehicle 200 includes a chargeable and dischargeable secondary cell 12, a step-up/down voltage converter 13 that raises or lowers the voltage of the secondary cell 12, an inverter 14 that converts direct-current electric power of the step-up/down voltage converter 13 into alternating-current electric power, and supplies the electric power to a traction motor 15, and a fuel cell 11.

The secondary cell 12 is constructed of a chargeable and dischargeable lithium-ion battery, or the like. The voltage of the secondary cell 12 in this embodiment is lower than the drive voltage of the traction motor 15. However, the voltage of the secondary cell is not limited so, but may also be a voltage that is equivalent to or higher than the drive voltage of the traction motor. The step-up/down voltage converter 13 has a plurality of switching elements, and raises a low voltage supplied from the secondary cell 12 into a high voltage for use for driving the traction motor, by on/off-operations of the switching elements. The step-up/down voltage converter 13 is a non-insulated bidirectional DC/DC converter whose reference electrical path 32 is connected to both a minus-side electrical path 34 of the secondary cell 12 and a minus-side electrical path 39 of the inverter 14, and whose primary-side electrical path 31 is connected to a plus-side electrical path 33 of the secondary cell 12, and whose secondary-side electrical path 35 is connected to a plus-side electrical path 38 of the inverter 14. Besides, the plus-side electrical path 33 and the minus-side electrical path 34 of the secondary cell 12 are each provided with a system relay 25 that turns on and off the connection between the secondary cell 12 and a load system.

The fuel cell 11 has a plurality of fuel unit cells that are supplied with hydrogen gas as a fuel gas and air as an oxidant gas, and that generate electricity through an electrochemical reaction between the hydrogen gas and the oxygen in the air. In the fuel cell 11, the hydrogen gas is supplied from a high-pressure hydrogen tank 17 to a fuel electrode (anode) via a hydrogen supply valve 18, and the air is supplied to an oxidant electrode (cathode) by an air compressor 19. A plus-side electrical path 36 of the fuel cell 11 is connected to the secondary-side electrical path 35 of the step-up/down voltage converter 13 via an FC relay 24 and a blocking diode 23. A minus-side electrical path 37 of the fuel cell 11 is connected to the reference electrical path 32 of the step-up/down voltage converter 13 via another FC relay 24. The secondary-side electrical path 35 of the step-up/down voltage converter 13 is connected to the plus-side electrical path 38 of the inverter 14, and the reference electrical path 32 of the step-up/down voltage converter 13 is connected to the minus-side electrical path 39 of the inverter 14. The plus-side electrical path 36 and the minus-side electrical path 37 of the fuel cell 11 are connected to the plus-side electrical path 38 and the minus-side electrical path 39, respectively, of the inverter 14, via the FC relays 24. The FC relays 24 turn on and off the connection between the load system and the fuel cell 11. When the FC relays 24 are closed, the fuel cell 11 is connected to the secondary side of the step-up/down voltage converter 13, so that the electric power generated by the fuel cell 11 is supplied together with the secondary-side electric power of the secondary cell 12 obtained by raising the voltage of the primary-side electric power of the secondary cell 12, to the inverter, which thereby drives the traction motor 15 that rotates wheels 60. At this time, the voltage of the fuel cell 11 becomes equal to the output voltage of the step-up/down voltage converter 13 and to the input voltage of the inverter 14. Besides, the drive electric power for the air compressor 19, and accessories 16 of the fuel cell 11, such as a cooling water pump, a hydrogen pump, etc., is basically provided by the voltage that is generated by the fuel cell 11. If the fuel cell 11 cannot generate the required electric power, the secondary cell 12 is used as a complement source.

A primary-side capacitor 20 that smoothes the low-side voltage is connected between the plus-side electrical path 33 and the minus-side electrical path 34 of the secondary cell 12. The primary-side capacitor 20 is provided with a voltage sensor 41 that detects the voltage between the two ends of the primary-side capacitor 20. Besides, a secondary-side capacitor 21 that smoothes the secondary-side voltage is provided between the plus-side electrical path 38 and the minus-side electrical path 39 of the inverter 14. The secondary-side capacitor 21 is provided with a voltage sensor 42 that detects the voltage between the two ends of the secondary-side capacitor 21. The voltage across the primary-side capacitor 20 is a primary-side voltage $V_L$ that is the input voltage of the step-up/down voltage converter 13, and the voltage across the secondary-side capacitor 21 is a secondary-side voltage $V_H$ that is the output voltage of the step-up/down voltage converter 13. Besides, a voltage sensor 43 that detects the voltage of the fuel cell 11 is provided between the plus-side electrical path 36 and the minus-side electrical path 37 of the fuel cell 11. The voltage sensor 43 also detects the cell voltage of each of the fuel unit cells that constitute the fuel cell 11. Besides, the plus-side electrical path 36 of the fuel cell 11 is provided with an electric current sensor 44 that detects the output current of the fuel cell 11.

A control portion 50 is a computer that contains a CPU that performs signal processing, and a storage portion that stores programs and control data. The fuel cell 11, the air compressor 19, the hydrogen supply valve 18, the step-up/down voltage converter 13, the inverter 14, the traction motor 15, the accessories 16, the FC relays 24, and the system relays 25 are connected to the control portion 50, and are constructed so as to operate according to commands from the control portion 50. Besides, the secondary cell 12, the voltage sensors 41 to 43, and the electric current sensor 44 are separately connected to the control portion 50, and are constructed so that the state of the secondary cell 12, and detection signals of the voltage sensors 41 to 43 and the electric current sensor 44 are input to the control portion 50. The electric vehicle 200 is provided with an ignition key 30 that is a switch for starting and stopping the fuel cell system 100. The ignition key 30 is connected to the control portion 50, and is constructed so that an on/off-signal of the ignition key 30 is input to the control portion 50.

An operation of the fuel cell system 100 constructed as described above will be described with reference to FIG. 2 to FIG. 4.

Figure 2:
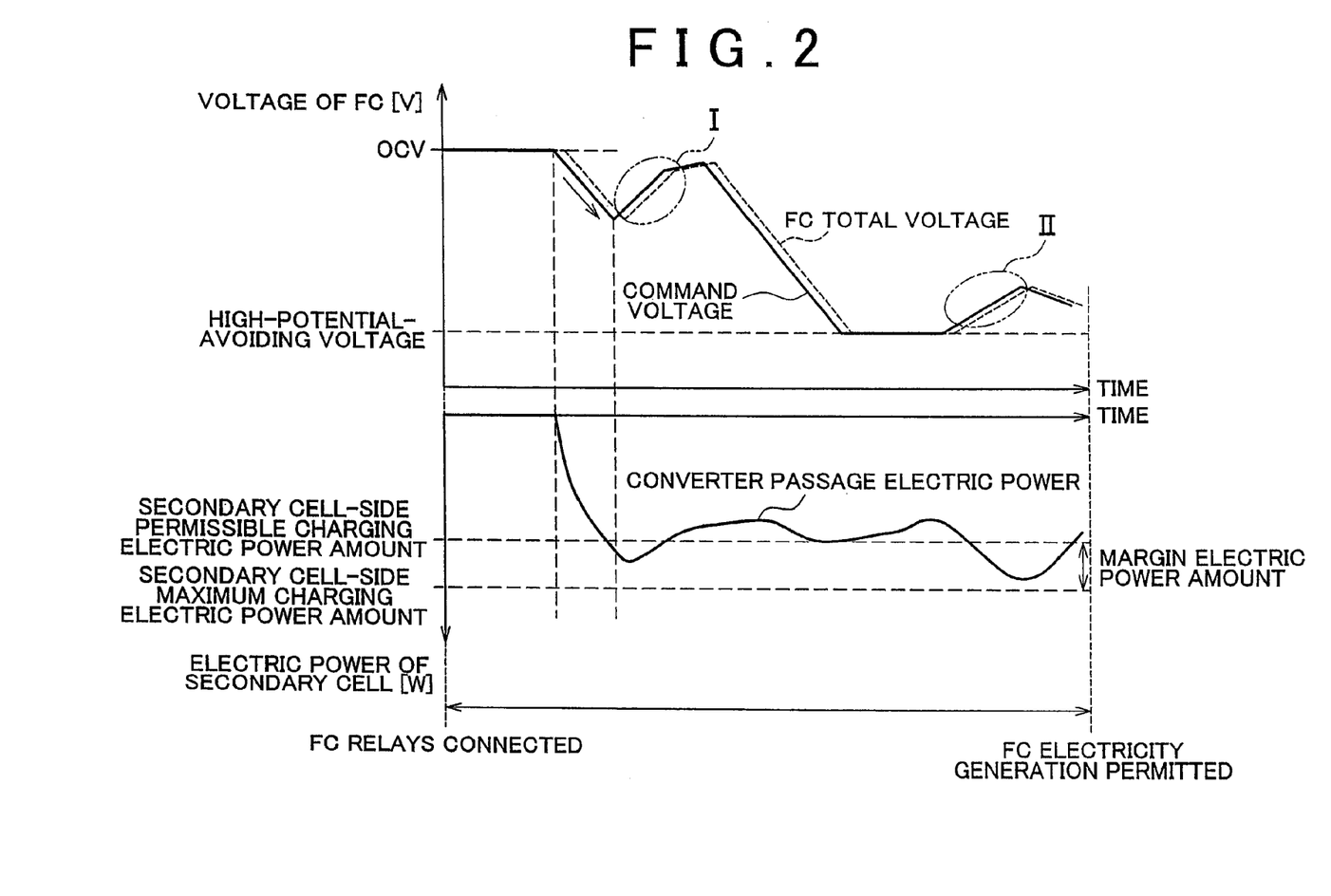
FIG. 2 is a diagram illustrating a voltage control of a fuel cell performed at the time of starting the fuel cell in order to avoid overcharge of a secondary cell.

FIG. 2 shows an example of a fuel cell voltage control performed at the time of starting the fuel cell, in order to avoid overcharge of the secondary cell. An upper part of FIG. 2 shows changes in the voltage of the fuel cell (hereinafter, also referred to as "FC"), and a lower part of the diagram shows changes in the electric power of the secondary cell. Furthermore, in the graph of changes in voltage in FIG. 2, a solid line shows the command voltage that is commanded to the fuel cell, and a dotted line shows the total cell voltage of the fuel cell stack. Incidentally, although FIG. 2 illustrates, for the sake of convenience in illustration, that the total cell voltage follows the command voltage with a considerable delay therefrom, the delay of the actual total cell voltage from the actual command voltage is not so large as shown in FIG. 2, but the total cell voltage changes substantially immediately following the command voltage. Besides, the solid line in the graph of the electric power of the secondary cell shows changes in the amount of electric power that passes through the step-up/down voltage converter 13.

Figure 3:
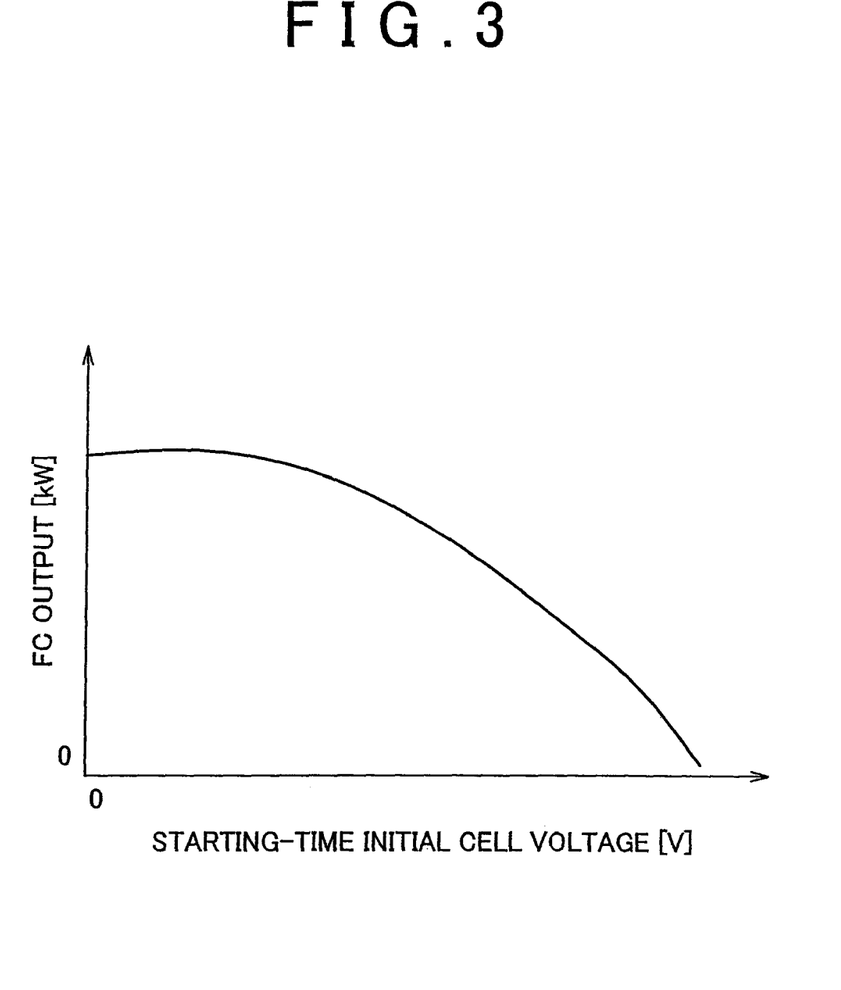
FIG. 3 is a diagram illustrating a relation between the initial cell voltage and the fuel cell output electric power in a fuel cell stack at the time of starting the fuel cell.

Before the voltage control of the fuel cell at the time of starting the fuel cell is described with reference to FIG. 2, the initial voltage and the output of the fuel cell immediately subsequent to the starting thereof will be described with reference to FIG. 3. As shown in FIG. 3, the total cell voltage of the fuel cell stack at the time of the starting thereof varies in accordance with the duration of operation stop of the fuel cell. That is, the total cell voltage is closer to 0 V the longer the operation stop duration, and the total cell voltage is higher the shorter the operation stop duration. Besides, the longer the operation stop duration of the fuel cell, the more activated the catalysts in the fuel cell become, and therefore the larger the amount of electricity generated at the time of starting the fuel cell becomes. On the other hand, in the case where the operation stop duration is short, the catalysts are less refreshed than in the case of a long operation stop duration, and therefore the amount of electricity generated at the time of starting the fuel cell is not large. That is, the amount of electricity generated immediately subsequently to the starting of the fuel cell remarkably fluctuates depending on the state of the catalysts of the fuel cell occurring immediately subsequently to the starting.

In the case where at the time of the starting, the fuel cell 11 generates more electric power than required by the load as shown in FIG. 1, the surplus electric power is charged into the secondary cell 12 that is provided in the electric vehicle 200. Usually, the secondary cell 12 has such a capacity that the output of the fuel cell at the time of the starting can be changed into the secondary cell 12. However, for example, during the charging at low temperature (the charging in a state of high resistance), the secondary cell 12 is likely to become overcharged, and therefore the charging is controlled with a restriction capacity that is lower than the maximum charge capacity of the secondary cell 12. As a result, if the total cell voltage of the fuel cell 11 is close to 0 V, the amount of electricity generated by the fuel cell 11 at the time of the starting thereof becomes large, so that the secondary cell 12 may be charged with the electric power generated by the fuel cell 11, beyond the restriction capacity of the secondary cell 12, and therefore the secondary cell 12 may become overcharged.

Besides, for example, in the case where, at the time of the starting, the air compressor 19 is operated at higher pressure than during the ordinary operation so as to supply air as an oxidant gas to the fuel cell 11, the amount of electricity produced from the fuel cell 11 immediately subsequently to the starting becomes large. In this case, too, there is possibility of the secondary cell 12 becoming overcharged since the secondary cell 12 is charged at high rate.

Furthermore, in the case where the secondary cell 12 is charged from a high SOC (state of charge), there is also possibility of the secondary cell 12 becoming overcharged.

Therefore, it is necessary to avoid the overcharge of the secondary cell caused by the starting-time output of the fuel cell before the electricity generation of the fuel cell is permitted. Therefore, in this embodiment, the control portion 50 shown in FIG. 1 has therein a voltage adjustment portion (not shown) for adjusting the voltage of the fuel cell between the open-circuit voltage (OCV) and a high-potential-avoiding voltage if the secondary cell 12 is expected to become overcharged when, at the time of starting the fuel cell, surplus electric power is charged into the secondary cell 12 and the output voltage of the fuel cell 11 is dropped from the open-circuit voltage to the high-potential-avoiding voltage. It is to be noted herein that the "high-potential-avoiding voltage" means a pre-determined target operation voltage that is less than the OCV and that can be generated by the fuel cell, so that durability of the fuel cell will be secured.

Furthermore, the foregoing voltage adjustment portion adjusts the operation voltage of the fuel cell 11 between the open-circuit voltage and the high-potential-avoiding voltage in at least one of the following cases: the case where the electric power that passes through the step-up/down voltage converter 13, which is a voltage transformer, exceeds a secondary cell-charging-purpose permitted-to-pass electric power that is found on the basis of at least the efficiency of the step-up/down voltage converter 13 and an input electric power restriction value $W_{in}$; the case where the input electric power restriction value $W_{in}$ for the secondary cell 12 is exceeded; and the case where the amount of electricity regenerated by the mover (the traction motor 15) which is charged into the secondary cell is not restricted.

An SOC estimation portion (not shown) that estimates the state of charge of the secondary cell is provided in the control portion 50. The SOC estimation portion receives inputs of signals needed for managing the secondary cell 12, for example, the inter-terminal voltage from the voltage sensor 41 disposed between the terminals of the secondary cell 12, the charging/discharging current (hereinafter, also referred to as "battery current") from an electric current sensor (not shown) attached to an electric power that is connected to an output terminal of the secondary cell 12, a cell temperature from a temperature sensor (not shown) that is attached to the secondary cell 12, etc., and stores the input signals. Besides, the SOC estimation portion estimates the state of charge (SOC, the amount of charge remaining) of the secondary cell 12 by integrating the secondary cell electric current value IB(t) that is actually measured by the electric power sensor, or by integrating the estimated electric current value that is corrected by an actually measured secondary cell temperature value TB(t).

The "input electric power restriction value $W_{in}$" is calculated by an input electric power restriction value calculation portion (not shown) that is provided in the control portion 50 shown in FIG. 1, in the following calculation manner. That is, using the state-of-charge value SOC(t) at a pre-set time t which is found by the SOC estimation portion, a permissible input electric current value per unit time during charging is found, and a permissible input electric current value $I_{lim}(t)$ that is permitted to be input to the secondary cell per unit time is calculated. Furthermore, through the PID control, the "input electric power restriction value $W_{in}$" is calculated by using the following expression (I).

$$W_{in}(t)=SW_{in}(t)-K_p\times\{IB(t)-I_{tag1}(t)\}-K_i\times\int\{IB(t)-I_{tag2}(t)\}dt \quad (I)$$

(where: $W_{in}(t)$ represents the secondary cell input electric power restriction value (W) at time t; $SW_{in}(t)$ presents a secondary cell input electric power restriction default value that is set beforehand; $K_p$ represents a p-term feedback gain; $K_i$ represents an i-term feedback gain; $I_{tag1}(t)$ represents an electric current restriction target value in conjunction with the p-term feedback control; $I_{tag2}(t)$ represents an electric current restriction target value in conjunction with the i-term feedback control; and IB(t) represents the battery current value at time t.)

Besides, the foregoing values $I_{tag1}(t)$ and $I_{tag2}(t)$ are obtained using the following expression (II).

$$I_{tag1}(t)=F_p(I_{lim}'(t)), \text{ and } I_{tag2}(t)=F_i(I_{lim}'(t)) \quad (II)$$

(where: $L_{lim}'(t)$ is calculated on the basis of a previously calculated permissible input electric current value $I_{lim}(t-1)$ that is previously calculated, or on the basis of a set permissible input electric current value $I_{lim}(0)$ exclusively for the initial calculation.)

Besides, the control portion 50 shown in FIG. 1 is provided also with an electricity generation amount calculation portion (not shown) that measures the voltage of the fuel cell 11 via the voltage sensor 43, and that calculates the amount of electricity generation of the fuel cell.

Furthermore, the control portion 50 shown in FIG. 1 is provided with a regeneration amount calculation portion that calculates the amount of regeneration provided by the traction motor 15, which is a mover. The amount of regeneration can be found using the expression (II). Therefore, the input electric power restriction value calculation portion, when the amount of regeneration at the time of the stating is taken into account, calculates the input electric power restriction value $W_{in}$ for the secondary cell 12 on the basis of not only the foregoing SOC of the secondary cell but also the amount of regeneration provided by the mover.

Besides, the control portion 50 shown in FIG. 1 is provided with a permitted-for-charging electric power calculation portion (not shown) that finds a secondary cell-charging-purpose permitted-to-pass electric power on the basis of at least the efficiency of the step-up/down voltage converter 13 and the input electric power restriction value $W_{in}$. For example, the permitted-for-charging electric power calculation portion finds the secondary cell-charging-purpose permitted-to-pass electric power, by multiplying the sum of the input electric power restriction value $W_{in}$ and the required electric power of the accessories 16 by the efficiency of the step-up/down voltage converter 13.

Besides, the control portion 50 shown in FIG. 1 is provided with an inputable electric power amount calculation portion (not shown) that finds a difference d1 between the calculated secondary cell-side permitted-for-charging electric power and the calculated amount of electricity generation of the fuel cell (i.e., the amount of electric power input to the secondary cell from the fuel cell), and a difference d2 between the estimated state of charge (SOC amount) of the secondary cell and the calculated input electric power restriction value $W_{in}$ (i.e., the amount of electricity that can be charged into the secondary cell), and that calculates the amount of electric power that can be input to the secondary cell, on the basis of the smaller one of the differences d1 and d2.

Next, an example of an operation of the fuel cell system of this embodiment will be described with reference to FIG. 1, FIG. 2 and FIG. 4. Firstly, if the ignition key 30 is turned on, the SOC estimation portion calculates the estimated electric current value I(t) from the voltage (t) of the secondary cell at the time t which is input to the SOC estimation portion, and estimates the state of charge SOC(t) occurring at the time t (S112). Next, if the brake is turned on (S114), a regenerated energy at the time t is calculated by the regeneration amount calculation portion (S116). Furthermore, the input electric power restriction value calculation portion calculates the input electric power restriction value $W_{in}(t)$ using the expression (I) and the expression (II), on the basis of the estimated state of charge SOC(t) at the time t or on the basis of the estimated state of charge SOC(t) and the regenerated energy (S118). Next, the permitted-for-charging electric power calculation portion finds a secondary cell-charging-purpose permitted-to-pass electric power; by multiplying the sum of the input electric power restriction value $W_{in}$ and the required electric power of the accessories 16 by the efficiency of the step-up/down voltage converter 13 (S120).

Next, the inputable electric power amount calculation portion finds a difference d1 between the calculated secondary cell-side permitted-for-charging electric power and the calculated amount of electricity generation of the fuel cell (i.e., the amount of electric power input to the secondary cell from the fuel cell) (S122), and finds a difference d2 between the estimated state of charge (SOC amount) of the secondary cell and the calculated input electric power restriction value $W_{in}$ (i.e., the amount of electricity that can be charged into the secondary cell) (S124), and then selects the smaller one of the differences d1 and d2 that are found as described above (S126). Furthermore, the inputable electric power amount calculation portion calculates the amount of electric power from the fuel cell 11 that can be input to the secondary cell, on the basis of the selected smaller difference (S128).

Figure 4:
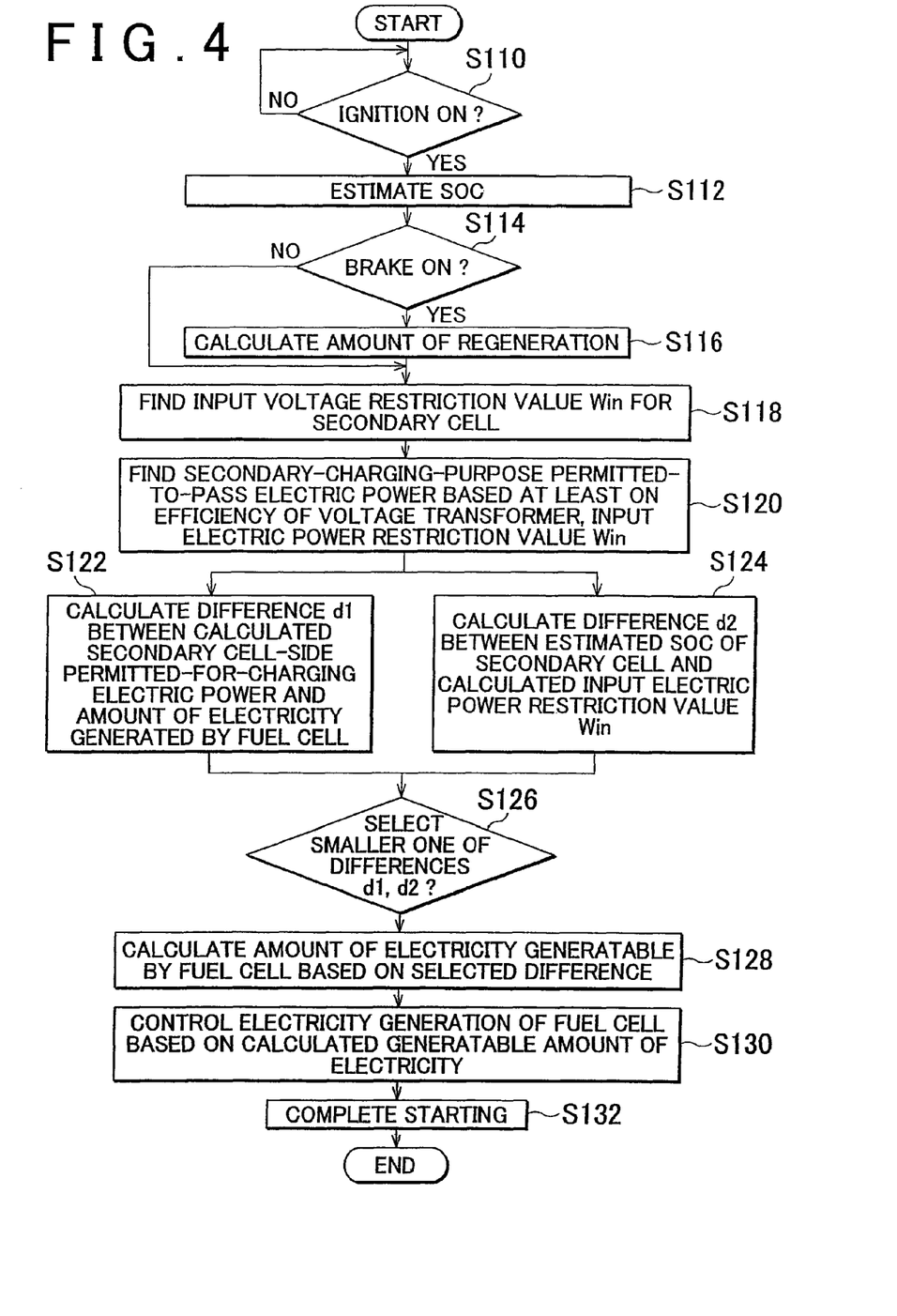
FIG. 4 is a flowchart illustrating an electric power control of a fuel cell at the time of starting a fuel cell system in accordance with an embodiment of the invention.

The voltage adjustment portion, as shown in FIG. 4, controls the amount of electricity generation of the fuel cell 11 by adjusting the operation voltage of the fuel cell 11 between the open-circuit voltage and the high-potential-avoiding voltage (S130) in at least one of the following cases: the case where the electric power that passes through the step-up/down voltage converter 13 exceeds the secondary cell-charging-purpose permitted-to-pass electric power at least during a period subsequent to the connection of the FC relays 24 of the fuel cell 11 but prior to the permission of the electricity generation of the fuel cell 11; the case where the input electric power restriction value $W_{in}$ for the secondary cell 12 is exceeded at least during the foregoing period; and the case where the amount of regeneration provided by the traction motor 15 is not restricted at least during the foregoing period. That is, as shown in FIG. 2, at the time of starting the fuel cell system, the operation voltage of the fuel cell 11 is temporarily raised to the OCV. Then, in order to ensure that durability of the fuel cell 11 is maintained, the operation voltage of the fuel cell 11 (i.e., the total cell voltage) is dropped from the OCV to the high-potential-avoiding voltage prior to the permission of the electricity generation of the fuel cell 11. Firstly in this operation, the operation voltage of the fuel cell 11 is dropped at an ordinary speed of drop. If the input electric power restriction value $W_{in}$ is exceeded, the speed of drop of the operation voltage of the fuel cell 11 is adjusted (a region I encircled by a dashed two-dotted line in FIG. 2). The operation voltage of the fuel cell 11 is being monitored. If the electric power that passes through the step-up/down voltage converter 13 exceeds the secondary cell-side permitted-for-charging electric power, that is, if, in the lower part of FIG. 2, the secondary cell-side permitted-to-be-charged electric power amount is exceeded, the operation voltage of the fuel cell 11 is adjusted, that is, raised, so that the electric power that passes through the step-up/down voltage converter 13 becomes smaller than the secondary cell-side permitted-for-charging electric power. Then, when the electric power that passes through the step-up/down voltage converter 13 becomes smaller than the secondary cell-side permitted-for-charging electric power, the operation voltage of the fuel cell 11 is dropped to the high-potential-avoiding voltage while the speed of drop of the operation voltage of the fuel cell 11 is adjusted so that the input electric power restriction value $W_{in}$ is not exceeded. It is to be noted herein that the "secondary cell-side permitted-to-be-charged electric power amount" is smaller than the secondary cell-side maximum chargeable electric power by a margin electric power amount, and is stored beforehand in an electric power adjustment portion. In addition, the margin electric power amount is set at, for example, 2 kW, in this embodiment. However, the margin electric power amount is appropriately set according to the speed of control of the operation voltage of the fuel cell.

Besides, at least in the case where the brake is turned on during the period subsequent to the connection of the FC relays 24 of the fuel cell but prior to the permission of the electricity generation of the fuel cell, the amount of regeneration by the traction motor 15 is calculated by the foregoing regeneration amount calculation portion in order to secure regenerative torque. In the case where the amount of regenerated electricity to be charged is not restricted, and where the electric power that passes through the step-up/down voltage converter 13 exceeds the secondary cell-side permitted-for-charging electric power as shown in the lower part of FIG. 2, the operation voltage of the fuel cell 11 is adjusted, that is, raised (a region II encircled by a dashed two-dotted line in FIG. 2) so that the electric power that passes through the step-up/down voltage converter 13 becomes smaller than the secondary cell-side permitted-for-charging electric power. Then, if the electric power that passes through the step-up/down voltage converter 13 becomes smaller than the secondary cell-side permitted-for-charging electric power, the speed of drop of the operation voltage of the fuel cell 11 is adjusted so that the input electric power restriction value $W_{in}$ is not exceeded. In this manner, the operation voltage of the fuel cell 11 is dropped to the high-potential-avoiding voltage.

The starting of the fuel cell is completed (S132) at the time point when the operation voltage of the fuel cell 11 is dropped to and stabilized at the high-potential-avoiding voltage by the voltage adjustment portion. Thus, at the time of the starting, the amount of electricity generation of the fuel cell 11 is adjusted while the state of charge of the secondary cell 12 is monitored and, according to need, the amount of regeneration by the traction motor 15 is also monitored. Therefore, the overcharged state of the secondary cell 11 is avoided, and regenerative torque of the traction motor 15 is also secured.

The invention is applicable to fields that use fuel cell systems, for example, the vehicle manufacturing industry, and the like.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell system comprising:
a fuel cell that generates electricity through an electrochemical reaction between a fuel gas and an oxidant gas;
a secondary cell that is chargeable and dischargeable and that is charged with electric power that is output from the fuel cell; and
a control portion that controls amount of electricity generated by the fuel cell at a time of starting the fuel cell, wherein
the control portion has a voltage adjustment portion that is programmed to charge the secondary cell with surplus electric power at the time of starting the fuel cell, and that is further programmed to adjust voltage of the fuel cell between an open-circuit voltage and a high-potential-avoiding voltage in a case where the secondary cell is expected to become overcharged while the output voltage of the fuel cell is decreased from the open-circuit voltage to the high-potential-avoiding voltage,
wherein the high-potential-avoiding voltage is a predetermined target operation voltage generated by the fuel cell that is less than the open-circuit voltage.

2. The fuel cell system according to claim 1, further comprising:
a voltage transformer provided between the secondary cell and a load; and
a mover,
wherein the case, in conjunction with the voltage adjustment portion, where the secondary cell is expected to become overcharged is at least one of a case where a passage electric power that passes through the voltage transformer exceeds a secondary cell-charging-purpose permitted-to-pass electric power that is found based at least on efficiency of the voltage transformer, and on an input electric power restriction value for the secondary cell, a case where the input electric power restriction value for the secondary cell is exceeded, and a case where amount of regeneration by the mover that is charged into the secondary cell is not restricted.

3. The fuel cell system according to claim 1,
wherein the control portion further includes: an electricity generation amount calculation portion that calculates amount of electricity generated by the fuel cell by measuring voltage of the fuel cell; an SOC estimation portion that estimates state of charge of the secondary cell; a regeneration amount calculation portion that calculates amount of regeneration provided by the mover; an input electric power restriction value calculation portion that calculates an input electric power restriction value for the secondary cell based on the state of charge of the secondary cell estimated, and on the amount of regeneration by the mover; a permitted-for-charging electric power calculation portion that finds a secondary cell-charging-purpose permitted-to-pass electric power based at least on efficiency of a voltage transformer, and on the input electric power restriction value; and an inputable electric power amount calculation portion that finds a first difference between the calculated secondary cell-side permitted-for-charging electric power and the calculated amount of electricity generated by the fuel cell, and that finds a second difference between the estimated state of charge of the secondary cell and the calculated input electric power restriction value, and that calculates an amount of electric power that is inputable to the secondary cell based on a smaller difference of the first difference and the second difference, and
wherein the voltage adjustment portion calculates amount of electricity that the fuel cell is able to generate based on an inputable amount of electric power, and adjusts the output voltage of the fuel cell between the open-circuit voltage and a target voltage.

4. A vehicle that has the fuel cell system according to claim 1.

5. A control method for a fuel cell system that includes: a fuel cell that generates electricity through an electrochemical reaction between a fuel gas and an oxidant gas; a secondary cell that is chargeable and dischargeable and that is charged with electric power that is output from the fuel cell; and a control portion that controls amount of electricity generated by the fuel cell at a time of starting the fuel cell, the control method comprising:
charging the secondary cell with surplus electric power at the time of starting the fuel cell;
determining whether or not the secondary cell is to become overcharged when output voltage of the fuel cell is decreased from an open-circuit voltage to a high-potential-avoiding voltage; and
adjusting voltage of the fuel cell between the open-circuit voltage and the high-potential-avoiding voltage if it is determined that the secondary cell is to become overcharged, wherein the high-potential-avoiding voltage is a predetermined target operation voltage generated by the fuel cell that is less than the open-circuit voltage.

* * * * *